Jan. 27, 1970    KAZUO ABE ET AL    3,492,302
PROCESS FOR THE PRODUCTION OF MELAMINE
Filed Oct. 24, 1966
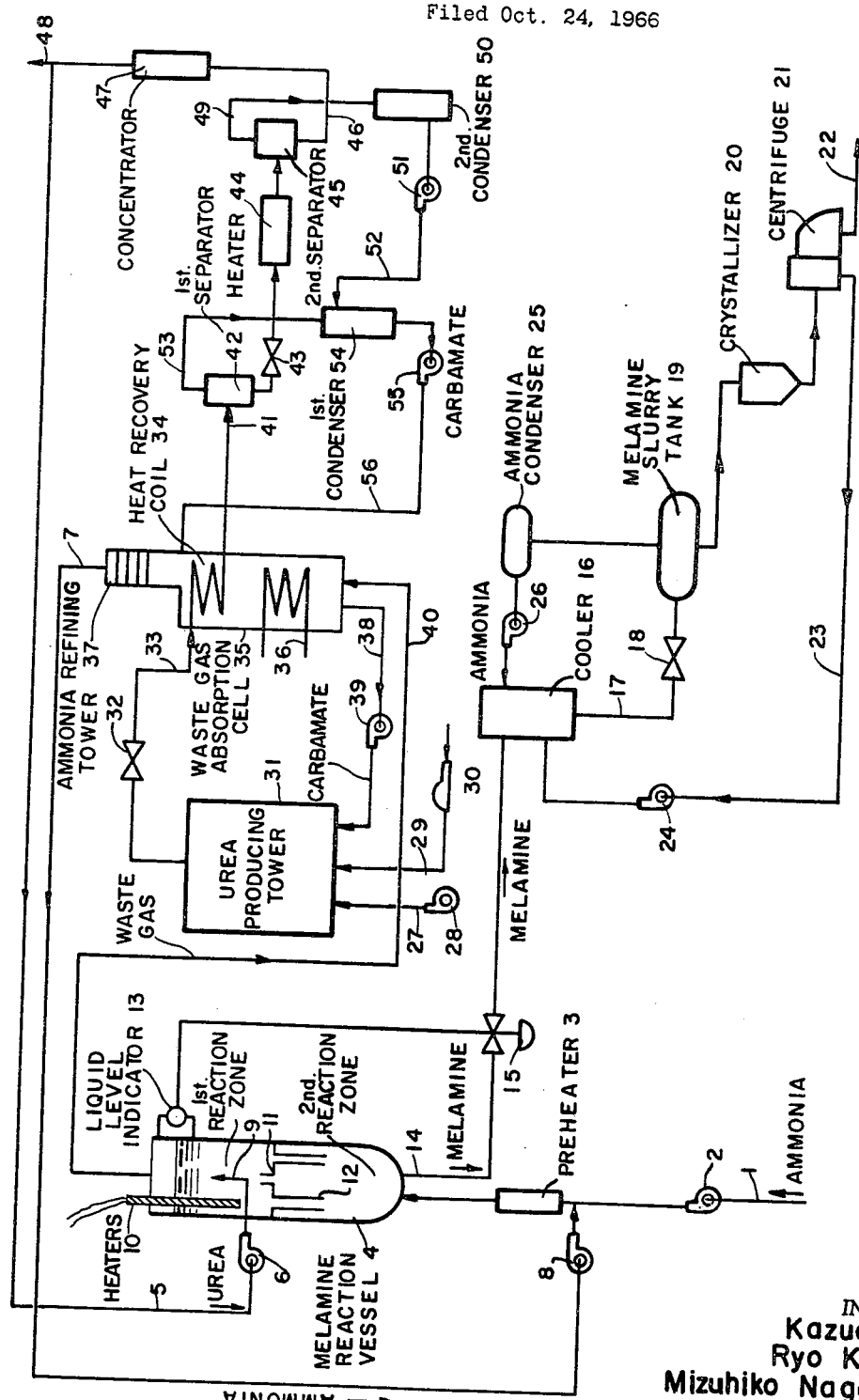
INVENTORS
Kazuo Abe
Ryo Kokubo
Mizuhiko Nagakura &
Koji Yokomichi
BY Holcombe, Wetherill & Brisebois
ATTORNEYS

United States Patent Office 3,492,302
Patented Jan. 27, 1970

3,492,302
PROCESS FOR THE PRODUCTION
OF MELAMINE
Kazuo Abe, Tokyo, and Ryo Kokubo, Mizuhiko Nagakura, and Koji Yokomichi, Toyama Prefecture, Japan, assignors to Nissan Kagaku Kogyo Kabushiki Kaisha, Tokyo, Japan, a corporation of Japan
Filed Oct. 24, 1966, Ser. No. 588,898
Claims priority, application Japan, Oct. 25, 1965, 40/65,408
Int. Cl. C07d 55/28
U.S. Cl. 260—249.7
6 Claims

ABSTRACT OF THE DISCLOSURE

The process of synthesizing melamine which comprises a urea-producing cycle and a melamine-producing cycle, in which a waste gas comprising ammonia and carbon dioxide is produced in the latter cycle and utilized to synthesize urea in the former cycle and the urea obtained from the former cycle is recirculated to the latter cycle as a material for use in melamine synthesis, the improvement being said waste gas is introduced without depressurization into an aqueous solution in a waste gas absorption cell which is operated at the same or lower pressure and positioned in a carbamate recycling circuit which forms part of the urea-producing cycle, said cell serving to produce a concentrated aqueous carbamate solution which is then used to synthesize urea in said urea-producing cycle.

---

This invention relates to a process for the production of melamine, which consists of a urea-producing cycle and melamine-producing cycle, the waste gas obtained from the latter cycle as a by-product being utilized for synthesis of urea in the former cycle and the urea produced in the former cycle being circulated to the latter cycle as a material for melamine synthesis.

The reaction formula for transforming urea into melamine in presence of urea and added ammonia is as follows:

$$6CO(NH_2)_2 + xNH_3 = C_3H_6N_6 + 3CO_2 + (6+x)NH_3$$

The waste gas obtained from this reaction is composed of carbon dioxide and ammonia.

In the above formula, the value of $x$ is known to range from 42 (about 20% by weight of ammonia to urea) to 0; but on the average the preferred value of $x$ is approximately 10. Consequently the composition of waste gas is 16% carbon dioxide and 84% ammonia. From the fact that this composition is nearly the same as the mol ratio used in the common process for urea synthesis, i.e., ammonia/carbon dioxide=3/1~5/1, it would be easy to infer that if this waste gas is employed to synthesize urea and the obtained urea is again used to synthesize melamine, the result will be production of melamine via urea from carbon dioxide and ammonia. However, the practical realization of the above process would meet the following difficulties:

(1) The pressure under which urea is to be synthesized is usually over 200 kg./cm.² (this is absolute pressure). Meanwhile, the pressure of the melamine waste gas is less than 200 kg./cm.² and its temperature ranges from 300° C. to 500° C. Thus, if said waste gas is to be delivered directly under pressure to the urea-synthesizing tower, installation of a high-temperature, high-pressure gas pump, blower, compressor, etc. would be obligatory and this would make the commercial exploitation of this process expensive.

(2) Next, even if a waste gas at a pressure of more than 200 kg./cm.² is obtained from the melamine-producing system, the hot melamine waste gas, if delivered directly into the urea-producing tower, will exist as bubbles, occupying a part of the space in said tower, until it cools down to the appropriate liquid temperature for urea synthesis. Consequently the reacting volume for urea synthesis will drop, thus lowering the efficiency per unit volume of urea synthesis. Moreover, around the inlet through which said waste gas enters a local hot spot will be created. This is undesirable from the standpoint of the mechanical strength and corrosion resistance of the device.

(3) When melamine and waste gas are separated under relatively low pressure (from atmospheric pressure to several times that pressure) and at a low temperature (below 250° C.), an aqueous solution of carbamate is obtained which will be of a low concentration and the circulation of carbamate will increase, thereby making it difficult to maintain the temperature in the urea-producing tower and lowering the conversion efficiency of said tower. Besides, the thermal energy of the hot waste gas will be wasted.

The present inventors, having investigated the direct utilization of melamine waste gas derived from the urea process under the high pressure liquid phase reaction to urea synthesis, have successfully overcome the above-mentioned difficulties and now offer a less expensive process for the production of melamine. A melamine waste gas comprising ammonia, carbon dioxide, etc. which is discharged from the top of the melamine reaction vessel is introduced without depressurization into a waste gas absorption cell operated at 130–160° C., and 60–150 kg./cm.² in a carbamate recycling circuit in the urea-producing cycle.

Thus, said waste gas is utilized as a concentrated aqueous solution of carbamate for urea synthesis. On the other hand, the sensible heat of said waste gas and the heat released by the formation of carbamate are exploited to decompose unreacted carbamate in the urea-synthesizing liquid and to generate steam. Further excessive ammonia in the waste gas is refined and recovered as liquid ammonia in the waste gas absorption cell.

Since in this invention the reaction of transforming urea into melamine is made to occur under a pressure of 60–150 kg./cm.², the operating conditions of the waste gas absorption cell, i.e., the temperature 130–160° C. and the pressure 60–150 kg./cm.² have been selected to assure perfect absorption of the melamine waste gas by the aqueous solution of carbamate and also to insure effective heat recovery. If the temperature is higher than this selected range, perfect absorption of melamine waste gas will be hindered. On the other hand, if the temperature is lower than the specified range the efficiency of heat recovery will drop. The operating pressure depends on the temperature. Low temperature corresponds to low pressure, while high temperature corresponds to a high pressure.

The present invention is applicable to what is commonly called the aqueous solution circulating method of urea synthesis. A detailed description of the invention follows:

(a) The pressure in the waste gas absorption cell is equal to that in the melamine reaction vessel, so that the melamine waste gas can be introduced without raising its pressure directly into the waste gas absorption cell. Thus there is no need for any special installation to carry the high-temperature high-pressure gas, which is a great boon to the industry.

(b) Since the melamine waste gas is introduced into the urea-producing tower after it has been fully absorbed, as an aqueous solution of carbamate in the waste gas absorption cell, there is no possibility of bubble generation or local heating in said tower.

(c) The melamine waste gas with a temperature of 360–450° C. and a pressure of over 60 kg./cm.² is recovered as a concentrated aqueous solution of carbamate in the waste gas absorption cell of the recycle circut for carbamate in the urea-producing system and any new addition of water is rendered unnecessary. Thus, the temperature in the urea-producing tower can be maintained and the conversion efficiency of said tower can be enhanced.

(d) As the operating temperature of the waste gas absorption cell is 130–160° C., the sensible heat of the melamine waste gas and the heat of carbamate formation can be exploited to decompose unreacted carbamate and to generate steam.

(e) The composition in the waste gas absorption cell becomes excessively rich in ammonia, so that the excess ammonia can be recovered as liquid ammonia through high pressure distillation from the top of the waste gas absorption cell and this ammonia can be reused as ammonia to be added in the melamine synthesis.

The annexed drawing is a flow sheet illustrating our new process for producing melamine.

Referring now to this drawing, a fresh supply of ammonia for use in the melamine-producing cycle is introduced through the pipe 1 and is compressed by the pump 2.

Meanwhile, the ammonia recovered in the waste gas absorption cell 35 is withdrawn through the pipe 7 and compressed by the pump 8. Ammonia from both sources passes through the preheater 3 and reaches the bottom of the melamine reaction vessel 4.

On the other hand, the molten urea derived from the urea-producing system via pipe 5 reaches the pump 6, where it is compressed; and then it is introduced through the molten urea pipe 9 into the melamine reaction vessel 4.

The melamine reaction vessel 4 is divided by partition board 11 into upper and lower reaction zones. In the first stage reaction zone at the upper part, the greater part of reaction from urea to melamine takes place and the reaction product goes down the descending pipe 12 into the second stage reaction zone at the lower part, where the transformation of said product into melamine is completed. The first stage reaction zone contains a large number of electric heaters 10 extending downwardly from the top of the reaction vessel 4.

The melamine reaction vessel 4 is kept at 360–450° C. and 60–150 kg./cm.²; and the purity of the melamine obtained is more than 99%. The melamine obtained goes through the extraction tube 14 and is discharged through the extraction valve 15. Said valve 15 is so interlocked with the liquid level indicator 13 that the liquid level of the first stage reaction zone may be controlled. The molten melamine flowing out of the valve 15 is delivered to the high pressure cooler 16, which is maintained at 20–70 kg./cm.²; and in which said melamine is cooled by the vaporizing liquid ammonia supplied through the pump 26. The solidified melamine dissolves in the mother liquor which comes in via pipe 23 from the pump 24, thus producing a melamine solution.

This melamine solution passes through pipe 17 to the reducing valve 18, where it is depressurized to atmospheric pressure after which it is introduced into the melamine slurry tank 19. The greater part of the liquid ammonia which was supplied to the high pressure cooler 16 is recovered in the slurry tank 19 and transformed into liquid ammonia by the ammonia condenser 25, to be recirculated to the high pressure cooler 16. The melamine slurry which has been separated from the ammonia in the slurry tank 19 passes through the crystallizer 20 and the centrifuge 21, from which it departs at 22 in the form of the desired end product.

In the meantime, the waste gas, which is a by-product of the melamine reaction, and which consists of ammonia and carbon dioxide, passes through the pipe 40 and enters the bottom of the waste gas absorption cell 35 which is held at 130–160° C. and 60–150 kg./cm.².

The sensible heat of the melamine waste gas, and the reaction heat generated by dissolution of the waste melamine gas in the aqueous solution of carbamate which is introduced via pump 55 and pipe 56, from the first condenser 54, are utilized in the heat recovery coil 34 to decompose unreacted carbamate in the urea-producing cycle and in the steam recovery coil 36 to generate steam.

At the top of the waste gas absorption cell 35 (which contains the coils 34 and 36) is the ammonia refining tower 37 in which the ammonia is recovered in the form of a liquid, after which it is recirculated as a raw material for use in melamine production, as hereinbefore described.

The concentrated aqueous solution of carbamate formed in the waste gas absorption cell 35 passes through pipe 38 and pump 39 into the urea-producing tower 31. On the other hand a fresh supply of ammonia (through pump 28 and pipe 27), and carbon dioxide (through compressor 30 and pipe 29), are respectively introduced into the urea-producing tower 31. The tower 31 is kept at a temperature of 180–200° C. and a pressure of 180–220 kg./cm.², and the resulting urea-producing liquid is depressurized by the valve 32 to 40–60 kg./cm.². The unreacted carbamate and excess ammonia in said liquid are partially decomposed through depressurization, further decomposed in the heat recovery coil 34, and in a mixed liquid and gaseous phase passes via pipe 41 to the first separator 42, where the gas and liquid are separated. The decomposed gas consisting of ammonia, carbon dioxide and water vapor then passes via pipe 53 into the first condenser 54, where it is absorbed in a dilute aqueous solution of carbamate received from the second condenser 50 via pump 51 and pipe 52. The pressure of the resulting aqueous solution of carbamate is raised by pump 55 after which it flows via pipe 56 into the waste gas absorption cell 35. Meanwhile the liquid urea withdrawn from the bottom of the first separator 42 still contains some unreacted carbamate, and is depressurized by a valve 43 to 2–5 kg./cm.² after which it passes through the heater 44 into the second separator 45. The heater 44 further decomposes the unreacted carbamate, while the second separator 45 separates the gas from the liquid. The separated gaseous mixture of ammonia, carbon dioxide and water vapor passes through pipe 49 into the second condenser 50, where said mixed gas is condensed, liquefied and then recirculated via the first condenser 54 and the waste gas absorption cell 35 to the urea-producing tower 31. The liquid urea withdrawn from the second separator 45 via pipe 46 contains some water and a little ammonia and carbon dioxide. This liquid is delivered to the concentrator 47 and the resulting concentrated liquid is recirculated for use in the melamine-producing system. When the production of urea exceeds the quantity required for melamine production, the excess urea may be withdrawn from the system as an end product at 48.

A quantitative example of a run utilizing our process follows:

3,020 kg./hr. of urea and 1,590 kg./hr. of ammonia were used for producing melamine at the rate of 1,000 kg./hr. This yielded a waste gas comprising 2,446 kg./hr. of ammonia and 1,108 kg./hr. of carbon dioxide at 400° C. and 100 kg./cm.². This waste gas was introduced into the bottom of a stainless steel-lined waste gas absorption cell 35 having an inner diameter of 1 meter and a height of 8 meters and was there absorbed for recycling in an aqueous solution of carbamate.

The aqueous solution of carbamate, containing 45.0% ammonia, 31.8% carbon dioxide and 23.1% water, was fed into the upper part of the waste gas absorption cell 35 at the rate of 8,242 kg./hr. at a temperature of 120° C.

The waste gas absorption cell was operated at 158° C. and 90 kg./cm.$^2$. The urea-producing liquid flowed through the coiled pipe inside the cell 35 at a rate of 12,760 kg./hr. The sensible heat of the melamine waste gas and the heat of carbamate formation were utilized to decompose the unreacted carbamate (thus producing ammonia 2,240 kg./hr., carbon dioxide 1,580 kg./hr., water 375 kg./hr.) and for generating steam at the rate of 1,100 kg./hr. at 4 kg./cm.$^2$.

466 kg./hr. of liquid ammonia was recovered at the top of the high pressure refining tower 37, which was 600 mm. in diameter and 6 m. high, and was installed on the top of the waste gas absorption cell. Meanwhile, an aqueous solution of carbamate containing 50.3% ammonia, 33.0% carbon dioxide and 16.7% water was obtained at a rate of 11,330 kg./hr. at the bottom of the cell 35 and was pumped to the urea-producing tower 31.

When this aqueous solution of carbamate and an additional supply of carbon dioxide at the rate of 1,430 kg./hr. were used, the excess of ammonia in the urea-producing tower amounted to 43%. Then after reaction at 185° C. and 200 kg./cm.$^2$, a urea-producing mixture of 25.4% urea, 30.3% ammonia, 21.8% carbon dioxide and 22.5% water was obtained at a rate of 12,760 kg./hr. Thus, 92.8% of the ammonia absorbed from the waste gas was converted to urea.

Further, when the addition of ammonia was insufficient in the reaction from urea to melamine or when large quantities of urea were to be produced for other purposes than melamine production, additional quantities of ammonia and carbon dioxide were supplied to the urea-producing tower, together with the aqueous solution of carbamate.

What is claimed is:

1. In the process of synthesizing melamine which comprises a urea-producing cycle and a melamine-producing cycle, and in which a waste gas comprising ammonia and carbon dioxide is produced in the latter cycle and utilized to synthesize urea in the former cycle and the urea obtained from the former cycle is recirculated to the latter cycle as a material for use in melamine synthesis, the improvement according to which said waste gas from the melamine reaction vessel is introduced without depressurization into an aqueous solution in a waste gas absorption cell which is operated at the same or lower pressure as said melamine reaction vessel and positioned in the carbamate recycling circuit which forms part of the urea producing cycle, said aqueous solution in said cell serving to produce a concentrated aqueous carbamate solution which is then used to synthesize urea in said urea-producing cycle.

2. The process of claim 1, wherein said absorption cell is operated at 130–160° C. and 60–150 kg./cm.$^2$.

3. The process of claim 1, wherein the sensible heat of said waste gas and the heat produced by the carbamate formation reaction are utilized in said waste gas absorption cell to decompose any unreacted carbamate and to generate steam.

4. The process of claim 1, wherein the pressure in said waste gas absorption cell is equal to the pressure in the melamine reaction vessel.

5. The process of claim 4, wherein said waste gas is introduced into the urea-producing tower after it has been fully absorbed in an aqueous solution of carbamate in said waste absorption cell.

6. The process of claim 5, wherein the excess ammonia in said waste gas absorption cell which does not react is recovered from said waste gas absorption cell.

References Cited

UNITED STATES PATENTS

| | | | |
|---|---|---|---|
| 3,354,205 | 11/1967 | Marten | 260—555 |
| 3,366,682 | 1/1968 | Heunks | 260—555 |
| 3,406,200 | 10/1968 | Fauser | 260—555 |
| 3,406,201 | 10/1968 | Baumann et al. | 260—555 |
| 3,239,522 | 3/1966 | Cook et al. | 260—249.7 |

HENRY R. JILES, Primary Examiner

JOHN M. FORD, Assistant Examiner

U.S. Cl. X.R.

260—555